United States Patent
Kim et al.

(10) Patent No.: US 11,756,459 B2
(45) Date of Patent: Sep. 12, 2023

(54) MULTI-DISPLAY PANEL ASSEMBLED DISPLAY

(71) Applicant: Samsung Display Co., LTD., Yongin-si (KR)

(72) Inventors: You Ra Kim, Seoul (KR); Young-Jun Seo, Suwon-si (KR); Yong Woo Yi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/468,059

(22) Filed: Sep. 7, 2021

(65) Prior Publication Data
US 2022/0128830 A1 Apr. 28, 2022

(30) Foreign Application Priority Data
Oct. 23, 2020 (KR) .......... 10-2020-0138361

(51) Int. Cl.
G09F 9/302 (2006.01)
G02B 27/09 (2006.01)

(52) U.S. Cl.
CPC ....... G09F 9/3026 (2013.01); G02B 27/0977 (2013.01); G09F 9/302 (2013.01)

(58) Field of Classification Search
CPC ............ G02B 27/0938; G02B 27/0977; G02B 27/01; G09F 9/302; G09F 9/3026; G09F 9/3023; G09F 19/16; H04N 9/3147
See application file for complete search history.

(56) References Cited

U.S. PATENT DOCUMENTS

| 6,473,240 | B1 | 10/2002 | Dehmlow |
| 6,561,651 | B1* | 5/2003 | Kubota ................ H04N 9/3147 |
| | | | 353/30 |
| 6,986,583 | B2* | 1/2006 | Nishio ................... G03B 21/26 |
| | | | 353/30 |
| 7,145,611 | B2 | 12/2006 | Dubin et al. |
| 2002/0011968 | A1* | 1/2002 | Nishio ................... G03B 21/10 |
| | | | 345/5 |
| 2016/0363744 | A1 | 12/2016 | Sumiyoshi |
| 2019/0028680 | A1* | 1/2019 | Shiraishi ............. H04N 9/3111 |

FOREIGN PATENT DOCUMENTS

| JP | 2002-196417 | 7/2002 |
| KR | 10-0860982 | 9/2008 |
| KR | 10-1157425 | 6/2012 |
| KR | 10-1830155 | 2/2018 |
| KR | 10-1932972 | 12/2018 |

\* cited by examiner

Primary Examiner — Xuemei Zheng
(74) Attorney, Agent, or Firm — KILE PARK REED & HOUTTEMAN PLLC (57) ABSTRACT

A display device includes display panels; and a specular reflection structure that converts positions of images displayed by the display panels and merges the images at a predetermined position to generate an integrated image, wherein the specular reflection structure includes at least one specular mirror that corresponds to each of the display panels, and the at least one specular mirror converts a display direction by reflecting the images displayed on the display panels wherein a size of each of the images is maintained.

15 Claims, 9 Drawing Sheets

MULTI-DISPLAY PANEL ASSEMBLED DISPLAY

CROSS-REFERENCE TO RELATED APPLICATION(S)

This application claims priority to and benefits of Korean Patent Application No. 10-2020-0138361 under 35 U.S.C. § 119 filed on Oct. 23, 2020 in the Korean Intellectual Property Office, the entire contents of which are incorporated herein by reference.

BACKGROUND

(a) Technical Field

The disclosure relates to a multi-display panel assembled display device that implements a single display device by assembling a plurality of display panels like tiles. The disclosure relates to a multi-display panel assembled display device that can prevent a non-display area at boundaries between the assembled display panels from being visually recognized.

(b) Description of the Related Art

A method has been devised to implement a single display device by attaching a plurality of display panels to form a large area or to form a variety of shapes. Such a multi-display panel assembled display device can be disposed in various shapes and sizes to fit the space by assembling the display panels in various combinations such as 1×N and N×N, and there is no size limit, and it is advantageous in cost compared to making one large panel.

However, since a multi-display panel assembled display device connects plural panels, the non-display area or areas at the boundary or boundaries may be visually recognized. In order to remove such a non-display area, a method using a complex optical system has been proposed, but its effectiveness is unclear or not optimal, and an increase in the size of a display device due to the complex optical system is problematic.

The above information disclosed in this background section is only for enhancement of understanding of the background of the disclosure, and therefore it may contain information that does not form the prior art that may already be known to a person of ordinary skill in the art.

SUMMARY

Embodiments provide a multi-display panel assembled display device in which a non-display area in boundaries between display panels is not visually recognized by solving the above-stated problems in the related art.

A display device according to an embodiment may include a plurality of display panels; and a specular reflection structure that converts positions of images displayed by the plurality of display panels and merges the images at a predetermined position to generate an integrated image, wherein the specular reflection structure includes at least one specular mirror that corresponds to each of the plurality of display panels and the at least one specular mirror converts a display direction by reflecting the images displayed on the plurality of display panels wherein a size of each of the images is maintained.

The display device may further include a display screen that displays the integrated image generated by the specular reflection structure.

The specular reflection structure may include a specular mirror that corresponds to one of the plurality of display panels in a 1:1 correspondence, and a specular mirror group that corresponds to one of the plurality of display panels in a 1:multiple correspondence.

The specular mirror group may parallelly move a display direction of an image displayed on a corresponding one of the plurality of display panels.

The specular mirror that corresponds to one of the plurality of display panels in a 1:1 correspondence may convert a display direction of an image displayed on a corresponding one of the plurality of display panels.

The plurality of display panels may be disposed in a matrix form on a plane.

The plurality of display panels may be disposed on a plurality of planes.

The plurality of display panels may be disposed in a first group and a second group that face each other, and the specular reflection structure may be disposed between the first group and the second group.

The at least one specular mirror may include a plurality of specular mirrors, and the plurality of display panels may correspond to the plurality of specular mirrors in a 1:1 correspondence.

The at least one specular mirror may include a light blocking layer that defines a light incident region or a light emission region.

The plurality of display panels may be disposed in a matrix form on a plane, and display areas of the plurality of display panels may be inclined at a predetermined angle with respect to the plane.

The display device may further include a light blocking wall that separates each image transmission path of each of the plurality of display panels.

According to embodiments, it is possible to implement a multi-display panel assembled display device in which the non-display area at the boundary between the panels is not visible by using an optical system consisting of only specular mirrors.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The disclosure will be described more fully hereinafter with reference to the accompanying drawings, in which embodiments are shown. The disclosure may be implemented in various different forms and is not limited to the embodiments described herein.

The drawings and description are to be regarded as illustrative in nature and not restrictive. Like reference numerals designate like elements throughout the specification.

In the drawings, the size and thickness of each element may be arbitrarily illustrated for convenience of description, and the disclosure is not necessarily limited to what is illustrated in the drawings. In the drawings, the thickness of layers, films, panels, regions, etc., may be exaggerated for clarity. In the drawings, for better understanding and ease of description, the thicknesses of some layers and regions may be exaggerated.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to be positioned above or below the target element, and will not necessarily be understood to be positioned "at an upper side" based on a side opposite to the direction of gravity.

For example, the spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

In addition, unless explicitly described to the contrary, the word "comprise" and variations such as "comprises" or "comprising", "include" and variations such as "includes" or "including", "has" and variations such as "have" or "having" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
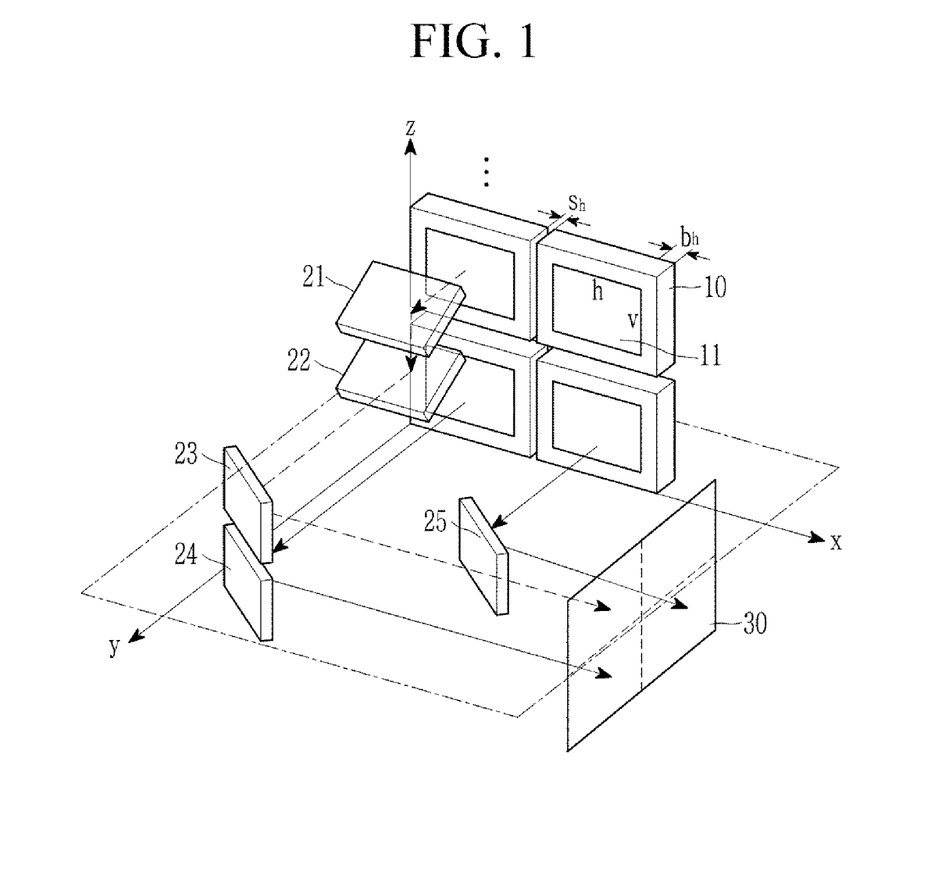
FIG. 1 is a multi-display panel assembled display device according to an embodiment.

FIG. 1 is a multi-display panel assembled display device according to an embodiment.

A multi-display panel assembled display device according to an embodiment may include a plurality of display panels 10, a plurality of specular mirrors 21, 22, 23, 24, and 25 constituting a specular reflection structure, and a display screen 30.

The plurality of display panels 10 may each include a display area 11 and a non-display area (for example, a bezel and the like) at the periphery of the display area 11. The plurality of display panels 10 may be disposed in a matrix format or form such that the display area can face toward a direction. In an embodiment, four display panels 10 disposed in a 2×2 matrix on the x-z plane are illustrated, but the alignment of the display panels may be expanded or reduced to N×M (here, N and M are natural numbers, excluding a case that N and M are both 1).

The specular mirrors 21, 22, 23, 24, and 25 are mirrors that reflect light incident with a predetermined angle (for example, about 45 degrees), and reflect images displayed on display areas 11 of the respective display panel 10 and transmit the reflected images to the display screen 30. The specular mirrors 21, 22, 23, 24, and 25 reflect light incident at a predetermined angle or only at a predetermined angle (for example, about 45 degrees), and thus the light can be transmitted to the display screen 30 without changing the size or contents of the image displayed on the display area 11. At least one of the specular mirrors 21, 22, 23, 24, and 25 may be disposed between each of the display panels 10 and a corresponding area of the display screen 30 such that the image displayed on the display area 11 can be transmitted to the display screen 30 without changing the size or contents of the image. In FIG. 1, the specular mirrors 21 and 22 vertically move an image, and the specular mirrors 23, 24, and 25 project the image to the display screen 30 by changing a display direction (changing a direction toward the y-axis direction to toward the x-axis direction) of the image. In FIG. 1, the specular mirrors 21, 22, and 23 move an image displayed on the display panel 10 along a downward direction (z-axis direction) in parallel, and then change the direction of about 90 degrees (from the y-axis direction to the x-axis direction) and display the image on the display screen 30. The specular mirrors 21, 22, and 23 parallelly move the image displayed by the display panel 10 and change the direction to reach the corresponding position of the display screen 30. The specular mirrors 24 and 25 change the direction of the image displayed by the display panel 10 to reach the corresponding position of the display screen 30.

The display screen 30 is a region on which the image is finally displayed, and may be a screen with physical substance, or it may refer to a virtual region in which the image is only recognized.

In such a multiple display panel assembled display device, the image displayed by each display panel 10 may be reflected by the specular mirrors 21, 22, 23, 24, and 25 and merged on the display screen 30, and a non-display area between the display panels 10 is not visible in the merged image. By adjusting the alignment positions of the specular mirrors 21, 22, 23, 24, and 25, the images that were separated from each other at the positions of the display panels 10 are made into a single integrated image that is merged such that the boundaries are exactly aligned on the display screen 30. Accordingly, a gap Sh between the display panels 10 and a gap bh between bezels are removed, and an integrated screen in which display areas each of (h, v) horizontally and vertically are merged can be implemented on the display screen 30.

Figure 2:
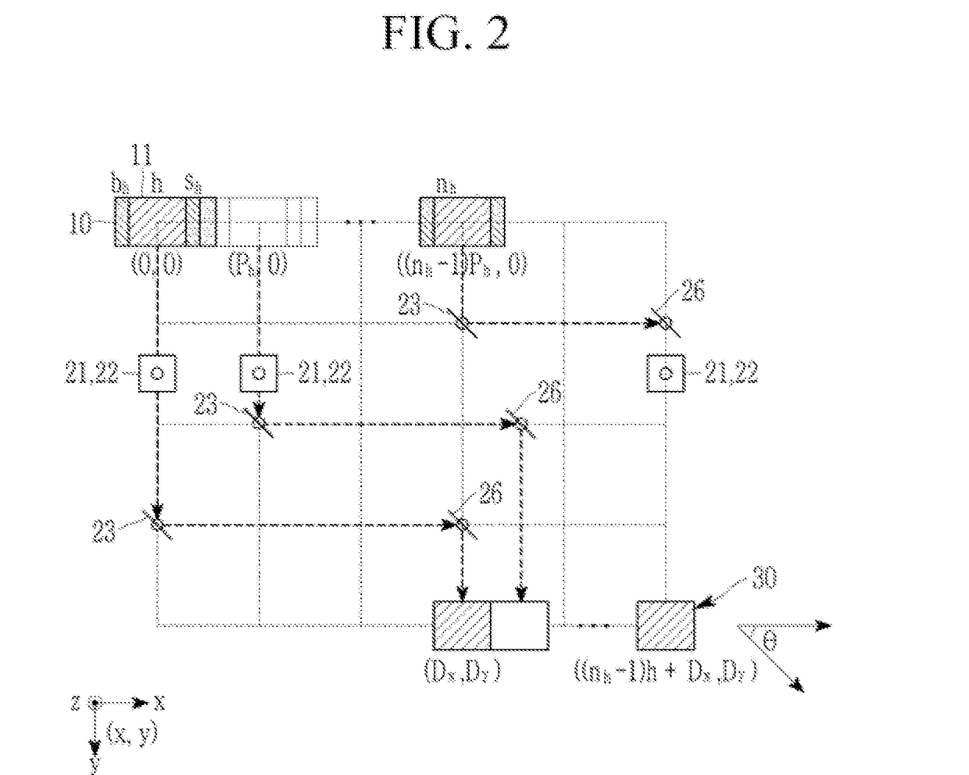
FIG. 2 is a schematic cross-sectional view of the multi-display panel assembled display device according to an embodiment.

FIG. 2 is a schematic cross-sectional view of the multi-display panel assembled display device according to an embodiment.

In the multi-display panel assembled display device according to an embodiment of FIG. 2, the specular mirrors 21, 22, 23, and 26 are disposed to align a direction (y-axis direction) that the display areas 11 of the respective panels 10 face and an image display direction (y-axis direction) of the display screen 30 to be equivalent to each other.

The specular mirrors 21 and 22 adjust positions of images in a vertical direction (z-axis direction), and the specular mirrors 23 and 26 adjust positions of images in a horizontal direction (x-axis direction) such that a merged image is displayed on the display screen 30 without boundary regions. In FIG. 2, "h" represents the width of each display area 11, $n_h$ represents the number of the display areas 11, Ph represents the interval between centers of two adjacent panels 10, Dx represents the coordinate of the left-most image on the x-axis, and Dy represents the coordinate of the merged image on the y-axis. The merged image on the display screen 30 extends from Dx to $(n_h-1)h+Dx$ in the x-axis direction and disposed on Dy in the y-axis direction.

Figure 3:
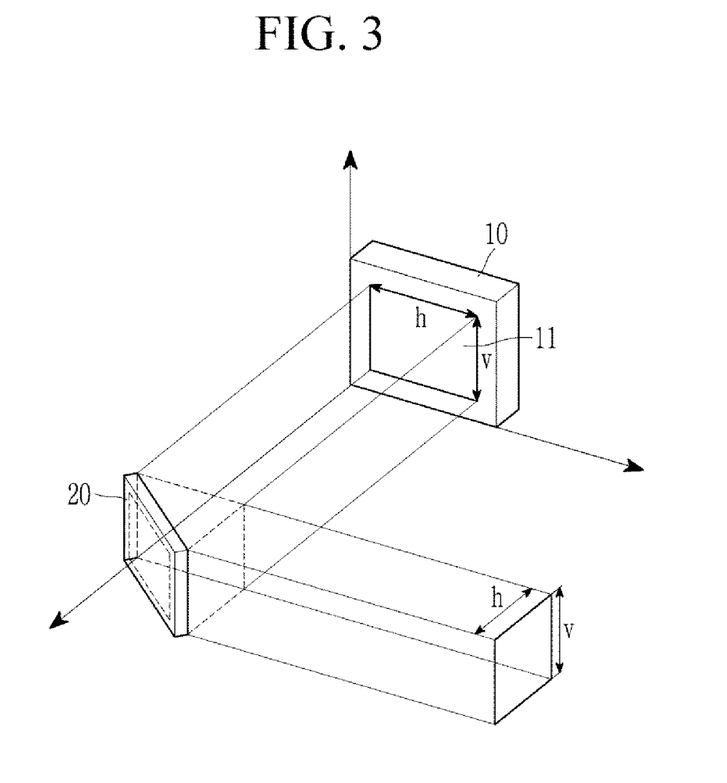
FIG. 3 is a schematic view of the specular mirror used in the multi-display panel assembled display device according to an embodiment.

FIG. 3 is a schematic view of the specular mirror used in the multi-display panel assembled display device according to an embodiment.

In an embodiment, the specular mirror 20 may be, for example, a mirror that reflects light with an incident angle of 45 degrees only, and may absorb or transmit the remaining light. Thus, in this embodiment the specular mirror 20 with the horizontal and vertical sizes of $(\sqrt{2}h, v)$ may be disposed while being inclined at an angle of 45 degrees in front of the display panel 10, which has the display area 11 having horizontal and vertical sizes of (h, v) to thereby change the display direction of an image displayed on the display area 11 of the display panel 10.

Figure 4:
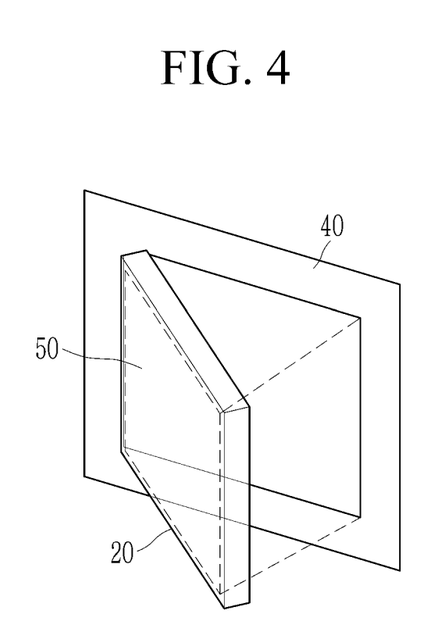
FIG. 4 and FIG. 5 are layout views of a filter or a shield that defines a light incident area of a specular mirror used in a multi-display panel assembled display device according to an embodiment.
Figure 5:
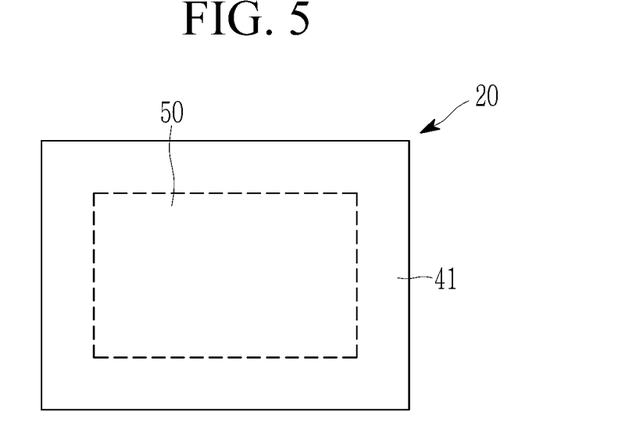

FIG. 4 and FIG. 5 are layout views of a filter or a shield that defines a light incident area of a specular mirror used in a multi-display panel assembled display device according to an embodiment.

As shown in FIG. 4, a light blocking layer 40 may be disposed in front of a specular mirror used in embodiments to prevent mixing of ambient light and limit a reflection region 50 of the specular mirror 20 by defining the light incident region or a light emission region of the specular mirror 20. As another example, as shown in FIG. 5, the reflection region 50 of the specular mirror 20 may be defined by forming a light blocking layer 41 on the edge or edges or periphery of the specular mirror 20. The light blocking layers 40 and 41 may be black or may be formed of a black material to minimize light reflection.

Figure 6:
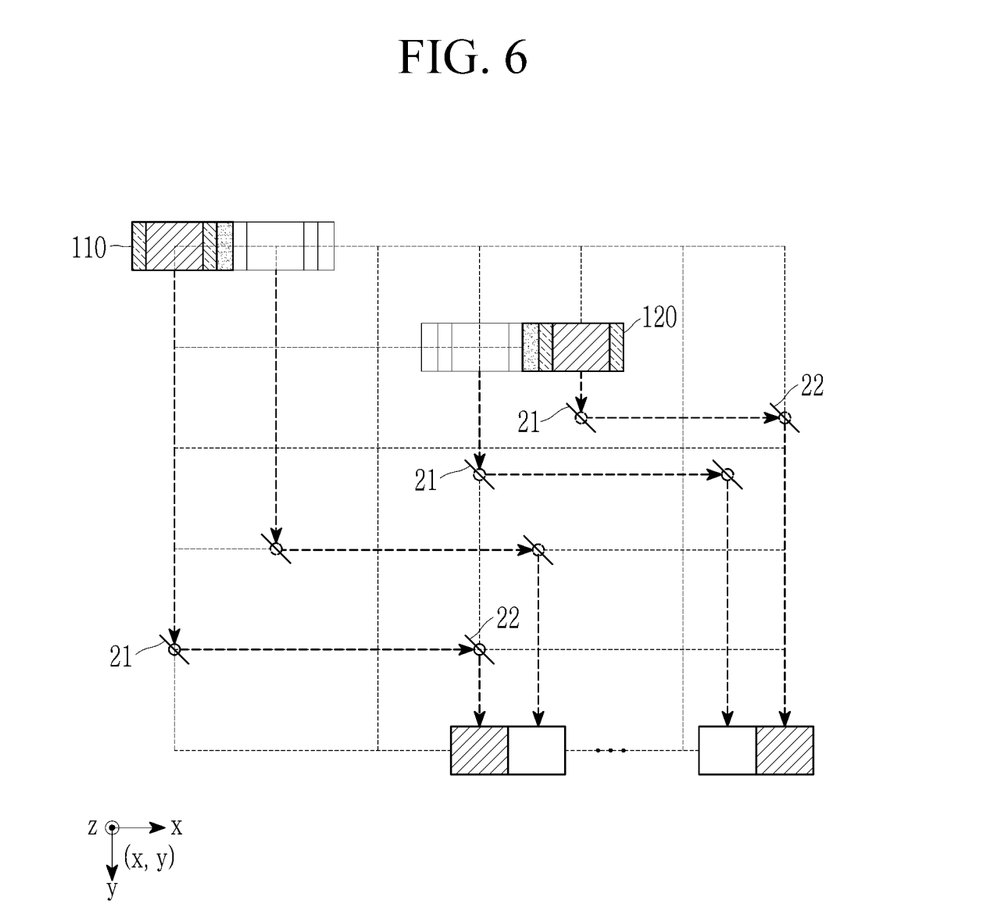
FIG. 6 is a schematic cross-sectional view of a multi-display panel assembled display device according to an embodiment.
Figure 7:
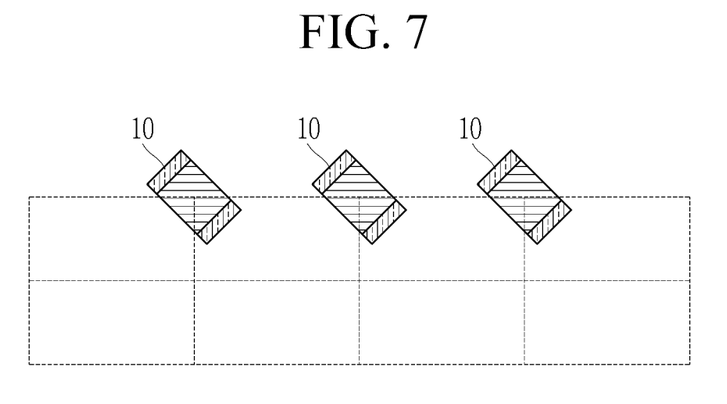
FIG. 7 is a layout view of display panels in the multi-display panel assembled display device according to an embodiment.

FIG. 6 is a schematic cross-sectional view of a multi-display panel assembled display device according to an embodiment, and FIG. 7 is a layout view of display panels in the multi-display panel assembled display device according to an embodiment.

In an embodiment of FIG. 6, display panels 110 and 120 may be disposed on different planes. As described, in addition to disposing of the display panel as a matrix on a same plane, numerous variations are possible such as multiple arrangements in space. As shown in FIG. 7, the display panels 10 may also be disposed such that a display area of display panels 10 may be inclined at a predetermined angle with respect to a plane in which display panels 10 may be arranged or disposed.

Figure 8:
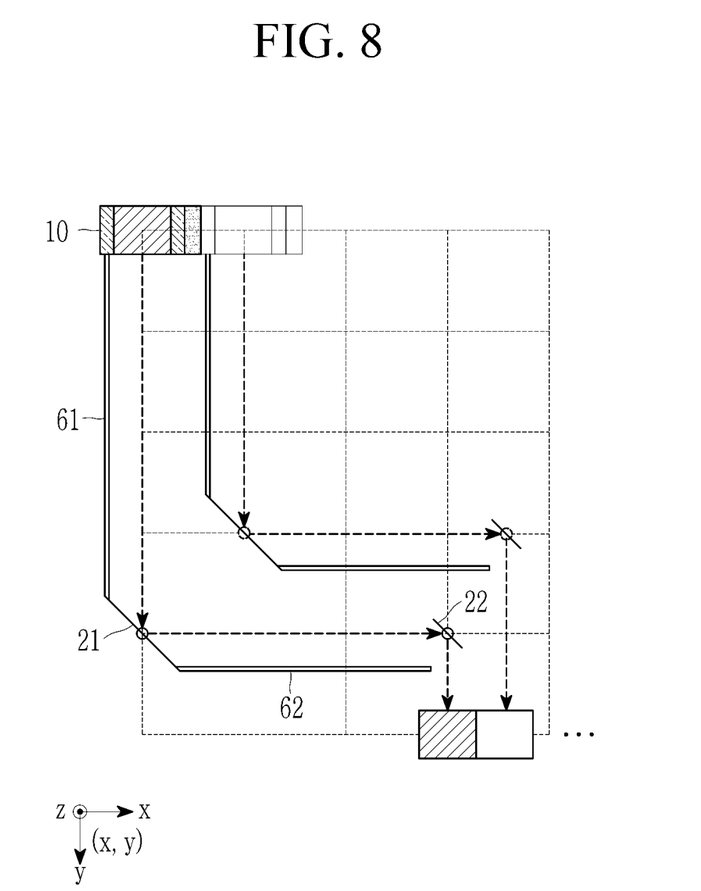
FIG. 8 is a schematic cross-sectional view of a multi-display panel assembled display device according to an embodiment.

FIG. 8 is a schematic cross-sectional view of a multi-display panel assembled display device according to an embodiment.

In an embodiment of FIG. 8, light blocking walls 61 and 62 that separate an image transmission path of each display panel 10 may be installed. The light blocking walls 61 and 62 prevent light from flowing in from the outside and being mixed with the image, and prevent light mixing between the display panels 10.

Figure 9:
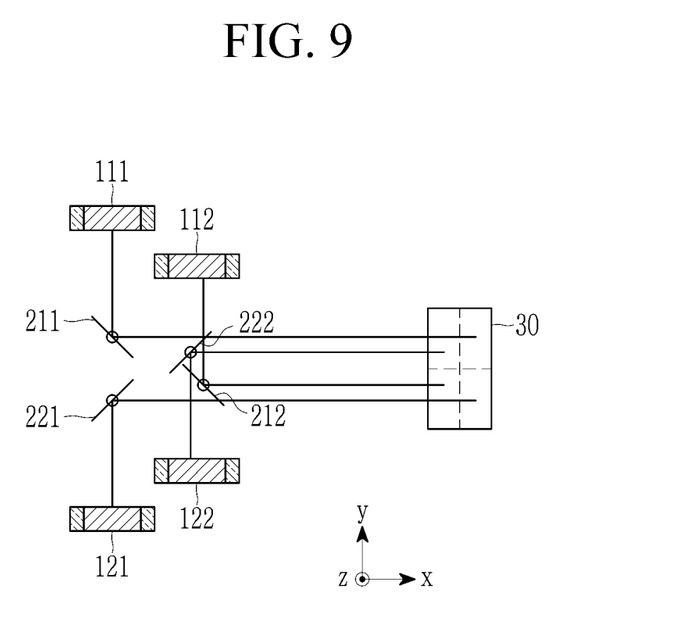
FIG. 9 is a schematic cross-sectional view of a multi-display panel assembled display device according to an embodiment.

FIG. 9 is a schematic cross-sectional view of a multi-display panel assembled display device according to an embodiment.

In an embodiment of FIG. 9, display panels 111, 112, 121, and 122 may be arranged or disposed in multiple in space. Two panels 111 and 112 of a first display panel group and two panels 121 and 122 of a second display panel group may be disposed to face each other, and specular mirrors 211, 212, 221, and 222 may be disposed in the space between the panels 111 and 112 and the panels 121 and 122 that face other. The two panels 111 and 112 of the first display panel group may be separated in vertical (z-axis direction) and horizontal (x-axis direction) directions, and the two panels 121 and 122 of the second display panel group may be separated in the vertical (z-axis direction) and horizontal (x-axis direction) directions. Specular mirrors 211, 212, 221, and 222 respectively corresponding to the display panels 111, 112, 121, and 122 may be separated from each other in the horizontal, vertical, and back and forth directions. A display screen 30 may be disposed at a position separated in the x-axis direction from regions where the specular mirrors 211, 212, 221, and 222 may be disposed. In an embodiment, four display panels 111, 112, 121, and 122 are distributed in lateral directions, but two or three display panels may be distributed in the lateral direction of the specular mirrors or five or more display panels may be distributed in the lateral direction of the specular mirrors. However, the disclosure is not limited thereto. As an example, the specular reflection structure may include a specular mirror (e.g., 25 of FIG. 1) of the plurality of specular mirrors that corresponds to a display panel of the plurality of display panels in a 1:1 correspondence, and a specular mirror group (e.g., a group comprising specular mirrors 21, 22, 23 of FIG. 1) that corresponds to a display panel of the plurality of display panels in a 1:multiple correspondence.

When the respective display panels 111, 112, 121, and 122 and the specular mirrors 211, 212, 221, and 222 are disposed as described above, only one specular mirror can be disposed per display panel, and thus it is possible to implement a multi-display panel assembled display device that displays an integrated image without boundaries.

While this disclosure has been described in connection with what is considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A display device comprising:
a plurality of display panels;
a specular reflection structure that converts positions of images displayed by the plurality of display panels and merges the images at a predetermined position to generate an integrated image; and
a display screen that displays the integrated image generated by the specular reflection structure, wherein
the specular reflection structure comprises at least one specular mirror that corresponds to each of the plurality of display panels, and
the at least one specular mirror converts a display direction by reflecting the images displayed on the plurality of display panels, wherein a size of each of the images is maintained, and
wherein the specular reflection structure comprises:
a specular mirror that correspond to one of the plurality of display panels in a 1:1 correspondence, and
a specular mirror group that corresponds to one of the plurality of display panels in a 1:multiple correspondence.

2. The display device of claim 1, wherein the specular mirror group parallelly moves a display direction of an image displayed on a corresponding one of the plurality of display panels.

3. The display device of claim 2, wherein the specular mirror that corresponds to one of the plurality of display panels in the 1:1 correspondence converts a display direction of an image displayed on a corresponding one of the plurality of display panels.

4. The display device of claim 3, wherein the plurality of display panels are disposed in a matrix form on a plane.

5. The display device of claim 3, wherein the plurality of display panels are disposed on a plurality of planes.

6. The display device of claim 5, wherein
the plurality of display panels are disposed in a first group and a second group that face each other, and
the specular reflection structure is disposed between the first group and the second group.

7. The display device of claim 6, wherein
the at least one specular mirror includes a plurality of specular mirrors, and
the plurality of display panels correspond to the plurality of specular mirrors in a 1:1 correspondence.

8. The display device of claim 1, wherein the at least one specular mirror comprises a light blocking layer that defines a light incident region or a light emission region.

9. The display device of claim 1, wherein
the plurality of display panels are disposed in a matrix form on a plane, and
display areas of the plurality of display panels are inclined at a predetermined angle with respect to the plane.

10. The display device of claim 1, further comprising a light blocking wall that separates each image transmission path of each of the plurality of display panels.

11. The display device of claim 1, wherein the plurality of display panels are disposed on a plurality of planes.

12. The display device of claim 11, wherein
the plurality of display panels are disposed in a first group and a second group that face each other, and
the specular reflection structure is disposed between the first group and the second group.

13. The display device of claim 11, wherein
the at least one specular mirror includes a plurality of specular mirrors, and
the plurality of display panels correspond to the plurality of specular mirrors in a 1:1 correspondence.

14. The display device of claim 1, wherein the specular reflection structure is configured for aligning boundaries of the images separated between the display panels, causing display of the integrated image without the boundaries.

15. The display device of claim 1, wherein
each display panel comprises a display area displaying a corresponding image and a non-display area, the images displayed by the plurality of display panels having one or more gaps between the images based on one or more of the non-display areas, and the specular reflection structure is configured for generating the integrated image based on removing the one or more gaps between the images.

\* \* \* \* \*